(12) United States Patent
Rosa-Bian et al.

(10) Patent No.: US 10,924,338 B2
(45) Date of Patent: Feb. 16, 2021

(54) CONTROLLER APPLICATION MODULE ORCHESTRATOR

(71) Applicant: Honeywell International Inc., Morris Plains, NJ (US)

(72) Inventors: John Rosa-Bian, Ambler, PA (US); Joseph Pradeep Felix, Coopersburg, PA (US); Paul Francis McLaughlin, Ambler, PA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/459,264

(22) Filed: Jul. 1, 2019

(65) Prior Publication Data

US 2020/0313960 A1 Oct. 1, 2020

Related U.S. Application Data

(60) Provisional application No. 62/825,883, filed on Mar. 29, 2019.

(51) Int. Cl.
*H04L 12/24* (2006.01)
*H04L 29/08* (2006.01)

(52) U.S. Cl.
CPC ......... *H04L 41/0803* (2013.01); *H04L 67/12* (2013.01)

(58) Field of Classification Search
CPC ................................................. H04L 41/0803
See application file for complete search history.

(56) References Cited

U.S. PATENT DOCUMENTS

| | | | |
|---|---|---|---|
| 2003/0028538 A1* | 2/2003 | Eikenbery | ............... G06F 16/27 |
| 2015/0215300 A1* | 7/2015 | Buonacuore | .......... H04L 63/205 |
| | | | 700/40 |
| 2016/0062350 A1* | 3/2016 | Prall | ..................... H04L 12/462 |
| | | | 700/20 |

* cited by examiner

*Primary Examiner* — Fahmida S Chowdhury
(74) *Attorney, Agent, or Firm* — Jetter & Associates, P.A.

(57) ABSTRACT

A network control system within an industrial processing facility (IPF) includes a controller platforms coupled to one another by a private path redundancy network providing a controller pool, each controller platform having at least one controller including computing hardware and a memory. An application module (AM) pool includes a plurality of AMs, wherein the controller platforms are coupled by an input/output mesh network to input/output devices coupled to field devices that are coupled to processing equipment in the IPF. A control application module orchestrator (CAMO) coupled to the plant-wide network is for dynamically deploying the AM's to the controller platforms, wherein the CAMO receives resource consumption attribute data regarding the controller platforms including a pool of available storage in the memory and processing resources available for the computer hardware. Based on the resource consumption attributes, the plurality of AMs are at least partially automatically deployed to the controller platforms.

15 Claims, 2 Drawing Sheets

CONTROLLER APPLICATION MODULE ORCHESTRATOR

CROSS REFERENCE TO RELATED APPLICATIONS

This application claims the benefit of Provisional Application Ser. No. 62/825,883 entitled "CONTROL APPLICATION MODULE ORCHESTRATOR, filed Mar. 29, 2019, which is herein incorporated by reference in its entirety.

FIELD

Disclosed embodiments relate to controllers for network control systems.

BACKGROUND

In deployments of conventional network control systems, the entity which is hosting the control function and responsible for the related control calculations (such as proportional integral differential (PID) control calculations) is typically an embedded computer device/platform, typically described as being a process "controller". Each controller comprises computing hardware generally including at least one processor or other computing device having an associated memory, such as being an embedded controller. What is referred to herein as a "controller platform" comprises one controller or a pair of controllers in the case of redundant controllers, where the controller platform hosts in its memory a control software "application module" such as the commercially available EXPERION control execution environment (CEE), marketed by Honeywell International Inc., hereafter cumulatively referred to as an Application Module (AM). Each "controller platform" communicates in a level above with at least one server over a plant-wide network, and levels below typically through an I/O network, then I/O devices, then sensors and actuators that control a portion of the processing equipment in the plant.

In order to ensure a high level of control system availability, the controllers in a network control system are typically deployed in a scheme which provides hardware redundancy, specifically 2 controller platforms deployed to do the job of one, or more specifically, a "primary" controller which is actively executing the control mission and a "backup" controller which is on standby, ready to assume the control mission if there is a failure of the primary controller. Accordingly, traditional high availability control system redundancy uses a primary controller along with a backup controller for each controller platform, which in the simplest non-redundancy control system case consists of a single controller.

Upon the failure of a primary controller in a redundant controller pair controller platform, non-redundant operation using the backup controller continues until a repair or replacement is made to the primary controller to restore the controller redundancy in the controller platform. The AM's are conventionally deployed in a ratio of 1:1 with the controller platforms. This means each controller platform whether redundant or not always hosts only one AM.

FIG. 1 shows a conventional network control system 100 with AM's in a 1:1 ratio with the controller platforms in the network control system 100 that shows 3 controller platforms 110 and 120 with redundant controllers, with each controller platform having a controller pair 111, 112 and 121, 122, respectively, and one controller 130 being a single (non-redundant) controller. Each controller includes computing hardware 171 and an associated memory 172. A dedicated (fixed) AM is stored (resides) in one of the respective memories 172 of each of the controller platforms, shown as AM 141 in memory 172 of controller 111 that provides an AM, and AM 142 which is analogous to AM 141 that provides an AM for the primary controller 121 and a backup AM for the redundant controller 122, and AM 143 provides an AM for controller 130 which can be AM for only a primary controller, or an AM for a primary controller and backup AM for a redundant controller.

The controller platforms 110, 120, 130 are each shown coupled by an input/output (I/O) mesh network 140 for controlling a portion of the processing equipment 160 shown coupled through I/O devices 145 to field devices 150 that comprises sensors and actuators. There is also shown a plant wide network 170 (e.g., such as an Ethernet network) between the controller platforms and server(s) 180, and at least one Human-Machine Interface (HMI) 185.

When redundant controllers shown as redundant controller 110 and redundant controller 120 are configured as in FIG. 1, the primary controller and backup controller can change roles with the backup controller becoming the primary controller when the primary controller is disabled so that the dedicated AM for the controller platform can support a different controller. However, the dedicated AMs (such as AM 141 and AM 142 shown in FIG. 1) always only support a fixed pair of controllers (primary controller 111 and secondary controller 112 shown in FIG. 1).

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize that a conventional network control system with AMs deployed in a dedicated (or fixed) 1:1 ratio to controller platforms such as in the conventional network control system 100 shown in FIG. 1 lacks flexibility and has other significant limitations problems deploying AM's. Disclosed controller application module orchestrator (CAMO) provide flexibility in the numerical relationship between devices or apparatus (here controller platforms) and AM's which are software resources that are dynamically deployed by the CAMO, such as in a ratio of 1:1, 1:N, N:N, where N>1.

This Disclosure recognizes with newer network control system designs, with modern information technology (IT) concepts such as virtualization and containerization, coupled with specific design adaptations for those technologies relevant to control technology deployments available, AMs can be deployed to controller platforms in a more flexible manner as compared to conventionally always being fixed 1:1 with the controller platforms. Specifically, using a disclosed CAMO, the AMs are available as a pool of AM's which are controlled by the CAMO to enable being automatically deployed to controller platforms in a non-1:1 fashion. The AM deployment flexibility provides network control system advantages including allowing multiple AM's to run on one controller platform so that the user does not always need to add hardware when they expand the control system. Furthermore, given that the AM's typically are needed to run on redundant platforms, disclosed AM deployment provides flexibility as to which controller platforms the AM's run on. This can be a significant advantage being over the life expectancy of a plant which runs continuously, because there may be a need to add additional AM's to the set of exiting/running AM's on a fixed set of controller platforms, and in order to host the new AM's, or the existing set of AM's needs to be rebalanced to better distribute the load on the available processing and memory resources of the existing controller platforms.

Disclosed aspects include a network control system within an industrial processing facility (IPF) that comprises a plurality of controller platforms coupled to one another by a private path redundancy network providing a controller pool, each controller platform having at least one controller including computing hardware and a memory. An AM pool includes a plurality of AMs, wherein the controller platforms are coupled by an I/O mesh network to I/O devices coupled to field devices that are coupled to processing equipment in the IPF. A CAMO coupled to the plant-wide network is for dynamically deploying the AM's to the controller platforms, wherein the CAMO receives resource consumption attribute data regarding the controller platforms including a pool of available storage in the memory and processing resources available for the computer hardware. Based on the resource consumption attributes, the plurality of AMs are at least partially automatically deployed to the controller platforms.

DETAILED DESCRIPTION

Figure 1:
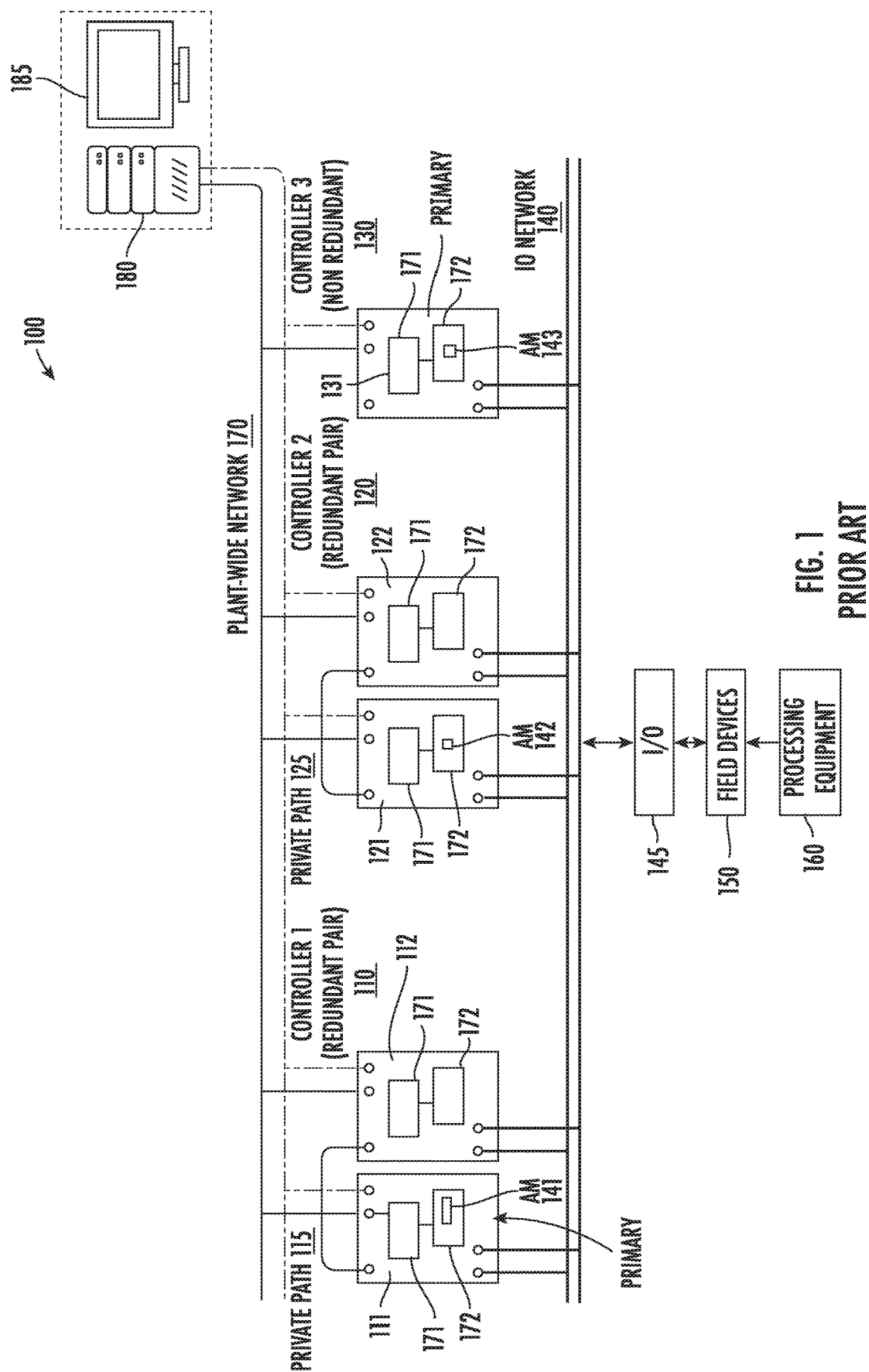
FIG. 1 depicts a conventional network control system with AMs configured in a dedicated 1:1 fashion with controller platforms showing 3 controller platforms and 3 (the same number) AMs.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

As used herein an industrial process facility includes field devices and processing equipment that runs an industrial process involving a tangible material that disclosed embodiments apply. For example, oil and gas, chemical, beverage, pharmaceutical, pulp and paper manufacturing, petroleum processes, electrical, and water. An industrial process facility is distinct from a data processing system that only performs data manipulations.

An enabling aspect for disclosed embodiments is an I/O mesh network. An I/O mesh is an I/O network configuration where instead of I/O's being bound via a physical, dedicated link to one specific process controller, the I/O's are instead meshed at the channel level to all controllers in a pool (or group) of controllers, so that any one process controller in the pool of controllers can have a flexible workload assignment to be able to act on inputs and outputs in the I/O mesh network. The I/O mesh network enables the flexible redundancy scheme. In brief, an I/O mesh network is a shared I/O network where multiple controllers and multiple I/O modules and devices reside on the same network, such that the I/O resources can be shared amongst the process controllers.

Figure 2:
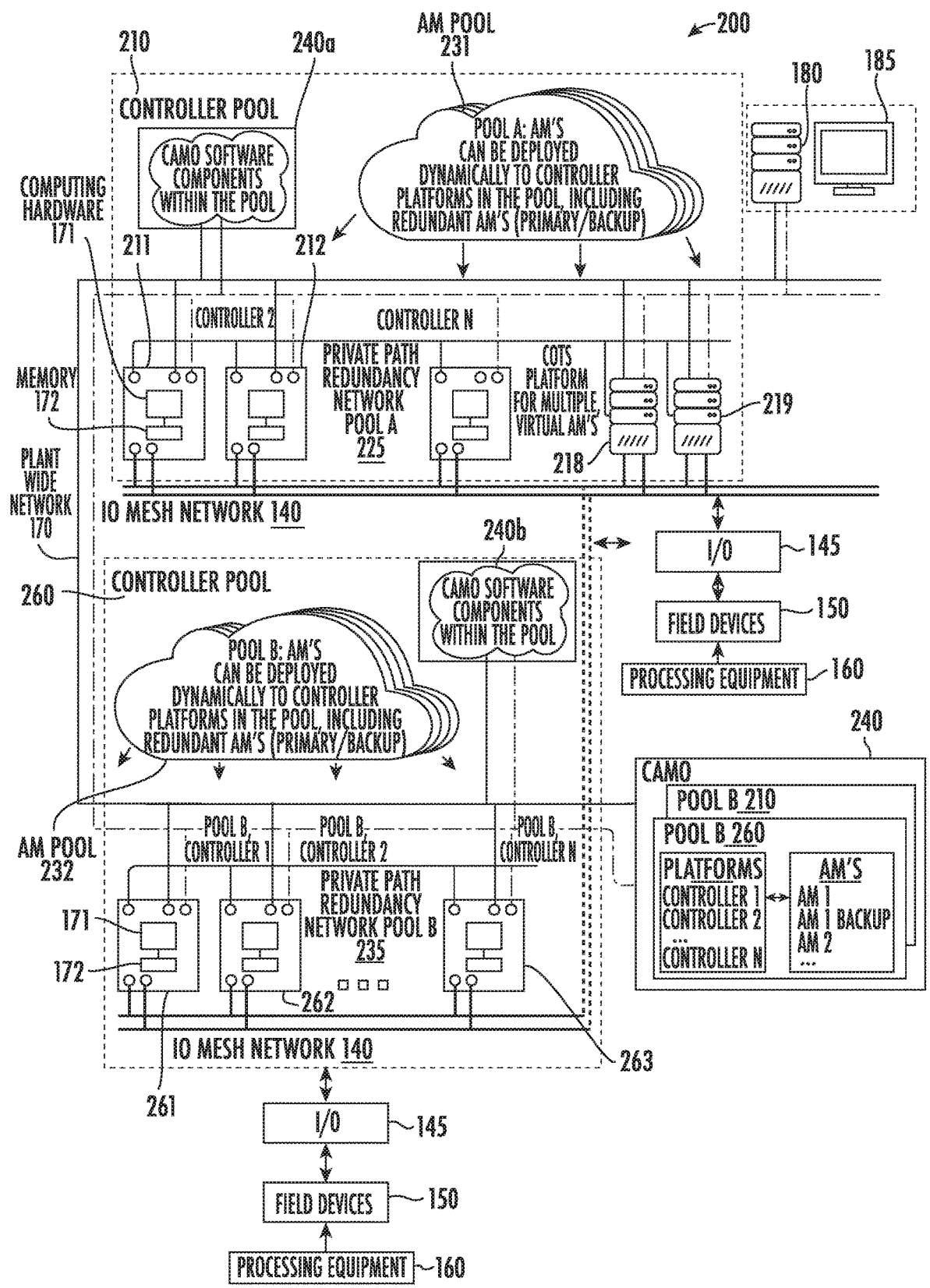
FIG. 2 depicts an example network control system implementing a disclosed CAMO, where the AMs are flexibly deployed by the CAMO including to other than in a 1:1 fashion to the controller platforms, showing a plurality of controller platforms with a lower number of AMs, according to an example embodiment.

FIG. 2 depicts an example network control system 200 comprising a first pooled controller platform 210 and a second pooled controller platform 260, where the network control system 200 includes a disclosed CAMO 240 for flexibly deploying, including dynamic deployment, the AM's shown as AM pool 231 and AM pool 232 being available to the respective pooled controller platforms 210 and 260, respectively. The controllers in the respective pooled controller platforms 210 and 260 are shown coupled to one another by a first private path redundancy network 225 and a second private path redundancy network 235, each redundancy network with a sufficient speed for time synchronization for providing the pool of controllers shown as first pooled controller platform 210 and a second pooled controller platform 260.

Although shown having 2 pooled controller platforms 210, 260, disclosed arrangements may be applied to a single pooled controller platform, or three or more pooled controller platforms. The redundancy networks 225, 235 provide a communication path, for controller pool coordination and synchronization of data traffic. For example, in order for a primary and backup AM in a controller platform to stay synchronized, the primary AM needs to send state data to the backup AM as it runs, so that the backup AM 'knows' exactly the state of the process to be above to take over for the primary AM at any time if it needs to.

The controller platform pool 210 is shown including controllers including controller 211, controller 212, and controller N, which all can be purpose-built embedded hardware platforms, and controller 218, and controller 219 optionally shown as comprising commercial off-the-shelf (COTS) computing platforms. Similarly, controller platform pool 260 includes controller 261, controller 262 and controller N shown as controller 263. The controllers each include computing hardware 171 having associated memory 172.

The AM pool in network control system 200 is shown as first AM pool 231 associated with the first pooled controller platform 210 and a second AM pool 232 associated with the second pooled controller platform 260. A plant-wide network shown as 170 (such as an Ethernet network) couples together the controllers in the respective controller pools 210 and 260, the CAMO 240, and the AM pools 231 and 232.

The CAMO 240 is configured to dynamically deploy to the AM's in each of the AM pools 231, 232 to the computing platforms in their respective controller pools 210, 260. The CAMO 240 generally receives inputs to monitor plant topology and computing hardware and memory resources, and in the event of a controller failure the CAMO 240 automatically or with optional user interaction can perform functions such as to restore a new backup AM on a pooled controller platform, a redundant backup controller on a pooled controller platform. The CAMO 240 can provide other responsibilities such as providing information to the user when deploying new AM's to allow the user to decide where AM's run by default, or which would allow the CAMO 240 to make that decision.

The CAMO 240 may be stored in any memory in the network control system 200, including a distributed arrangement with a portion of the CAMO within the controller pools 210, 260 shown in FIG. 2 as CAMO 240a and CAMO 240b and a portion shown as CAMO 240 that is outside the controller pools. Alternatively, the CAMO may be stored at the server level with the server 180 or even in the cloud.

The AMs 231 and 232 generally comprise a software 'container' for a control software application. The AM's control software applications can be internally developed software (such as the Honeywell EXPERION CEE, or other advanced applications), or 3rd party applications. AM's can be inherently redundancy aware/capable (as is the case with the EXPERION CEE), or a conventional application that is not designed for redundancy.

The network control system 200 includes an I/O mesh network 240, connected between the controller pools and the I/O devices 145. The 10 mesh network 240 is needed because the job of a controller is to process input data that comes from inputs including sensor inputs, and make intelligent decisions about how to change the outputs that are coupled to actuators in order to govern the process itself, where the controllers communicate directly with the I/O devices 145. Although shown serving 2 controller pools 210 and 260, the I/O mesh network 240 can serve one controller pool, or three or more controller pools.

Each controller pool 210 and 260 is thus a flexible pool of controller resources, for hosting a set AM's shown, that can be dynamically managed by the CAMO 240. In FIG. 2, the AM's 231 and 232 have thus been decoupled from the controller platforms (in contrast to being fixed in FIG. 1) by the CAMO 240 such that each controller platform can assume the hosting of one or more AM's. For redundant AM's, the AM's can host a primary AM and a backup AM, or multiple AM's of varying roles, provided that the active AM and its backup AM are not on the same controller platform. Upon the failure of a controller in a controller pool 210, 260, typically due to a hardware component failure, any primary AM's that were running inside of it will switchover to their backup AM running on another controller in the controller pool which resumes control albeit non-redundant after the failure. Any backup AM's running on that failing controller will cease to run, leaving their primary AM running elsewhere on the controller pool running, unaffected, but temporarily non-redundant. A new backup AM can be brought up automatically by the CAMO 240, with this new backup AM restoring the overall network control system 200 availability relatively quickly.

Disclosed CAMO 240 for network control systems thus deploy AMs in a more flexible manner to the controller platforms which can be deployed based on the preference of the user, including automatically, manually, or a mix of automatic and manual-based on the nature of the AM or failure scenario, mapping AMs in AM pools(s) to controllers in controller pools in one the following example non 1:1 ways.

1. 1 controller platform simultaneously hosts M AMs, where M is an integer greater than 1.
2. 1 controller platform hosts M AMs, where M is an integer greater than 1, where some or all of the AMs are redundant, backed up by N controller platforms, where N is an integer greater than or equal to 1.
3. L controller platforms, where L is an integer greater than one, each hosting M AMs, where M is an integer greater or equal to 1, backed up by N controller platforms, where N is an integer greater or equal to one.
4. Dynamic variations of the above, allowing for AMs to be 'moved' and redeployed between controller platforms. AM's may be moved by the CAMO 240 if the computing load changes for a variety of reasons. For example, if an additional AM was added, or more load is added to an existing AM, the AM resources might be re-balanced by moving AM's about amongst the controller platforms. Another example is the failure of a computing platform, then recovery by adding or repairing a node, and rebalancing so that each node has an equivalent scale of loss.
5. Variations of the above, where the respective AMs are deployed as either a redundant or non-redundant entity, and its redundancy role at any given time on any given controller platform might be either the primary or the backup instance.
6. AMs from 3rd parties, delivering a broad array of possible functions.

Where possible, provisioning, deployment and movement/remapping of AMs, while in-process and running process control, such of controlling an industrial process.

The CAMO 240 as noted above generally comprises a software engine with the primary responsibility to manage the deployment and mapping of AMs on the controller platforms. Non-limiting examples of deployments and mappings are listed above, on the network, include the following features:

Intelligent, automatic deployment of AMs to controller platforms based on resource availability by load balancing, specifically by monitoring the pool of available memory and processing resources on the processor(s) available on each controller platform. If the user prefers that such operations are not performed automatically by the CAMO 240, as noted above the CAMO 240 can provide the optional for manual AM to controller platform assignment by the user, where the AM deployment can be based on recommendations provided by the CAMO 240.

Disclosed aspects include intelligent deployment of temporary, and backup AMs in the event of the failure of an AM in a redundant controller pair. Calculation of AM/system availability and provision of recommendations to raise availability, such as the deployment of additional controller platforms. The CAMO 240 accomplishes its primary function by considering the following attributes, generally all simultaneously:

Resource consumption of controller platforms on the network, such as memory, CPU, communications and network bandwidth. The physical location of controller platforms on the network, relative to the plant infrastructure, including attributes such as control unit, building, floor, room, and power source. The physical I/O connectivity for controller platforms on the IO mesh 140 network (different controller platforms might be connected to different combinations of I/O networks. The security profile of the controller platform, including physical security. The deployment topology, such as integration with other systems, such as safety systems. The control application affinities, such as before/after relationships. The execution period and fit to the AM's, peer references, and geographic location in proximity to the physical process controlled by the network control system.

Additionally, the CAMO 240 can provides enablers described below which ensure that network communication from controller platform to AMs seamlessly continues in an uninterrupted fashion, while on-process, and while AMs can be 'moved' when needed across controller platforms including between controller pools. For example, regardless of protocol or direction of communication traffic, network communications are generally dependent upon an addressing scheme which ensures that messages reach their intended destination and continue to do so across any normal or abnormal plant event, including the failure of a controller platform, causing any primary AMs inside the controller platform to switchover to its backup AM on a different controller platform. Different addressing schemes and designs can be implemented in current and potentially future vintages of products (internal and external). For example: fixed vs. floating address schemes, mapped to controller platforms or AM's inside them. The CAMO 240 can manage the mapping of addressable nodes to AMs, across a heterogeneous vintage of devices, thus ensuring seamless and uninterrupted communication throughout the following example use cases listed below:

For the failure of a device user interaction, such as the configuration and deployment of new AMs, dynamic and automatic reallocation of existing computing resources changes to the physical network, such as deployment/removal of controller platforms responsive to changes to the I/O mesh network 140 connectivity profile of a controller platform's maintenance operations. Disclosed embodiments can be applied to a wide variety of applications including generally any type of distributed control system (DCS) including supervisory control and data acquisition (SCADA) systems.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method, comprising:
providing a network process control system in an industrial processing facility (IPF) comprising a plant-wide network coupling at least one server to a plurality of controller platforms all coupled to one another by at least one private path redundancy network for providing a controller pool, each controller platform having at least one controller comprising computing hardware and a memory, and at least one application module (AM) pool including a plurality of AMs, wherein the plurality of controller platforms are coupled by an input/output (I/O) mesh network to I/O devices coupled to field devices that are coupled to processing equipment 160 on a field level of an industrial processing facility (IPF), the method comprising:
considering resource consumption attributes by the respective ones of the plurality controller platforms comprising at least a pool of available storage in the memory and the processing resources available for computing hardware, and
based on the resource consumption attributes, at least partially automatically deploying ones of the plurality of AMs to the plurality of controller platforms
wherein the plurality of controller platforms are configured as a first and at least a second controller pool, and wherein the at least one AM pool is configured as a first AM pool and at least a second AM pool, wherein the AM's in the first AM pool are deployable only in the first controller pool, the AM's in the second AM pool are deployable only in the second controller pool.

2. The method of claim 1, further comprising real-time monitoring of available storage in the memory and the processing resources available from the computing hardware, wherein the at least partially automatically deploying comprises real-time deploying.

3. The method of claim 1, wherein the at least partially automatically deploying consists of exclusively of automatically determining.

4. The method of claim 1, wherein at least one of the plurality of controller platforms comprise a redundant controller pair.

5. The method of claim 1, wherein the AM pool comprises a plurality of AM's including redundant AM's including a primary AM and a backup AM.

6. The method of claim 1, wherein the at least partially automatically deploying comprises dynamically moving at least one AM in the AM pool responsive to at least one change to the plurality of controller platforms.

7. The method of claim 1, wherein the at least partially automatically deploying ones of the plurality of AMs to the plurality of controller platforms is implemented in a non 1:1 fashion.

8. A network control system within an industrial processing facility (IPF), the network control system comprising:
a plant-wide network coupling at least one server coupled to a plurality of controller platforms coupled to one another by a private path redundancy network for providing a controller pool, each controller platform having at least one controller comprising computing hardware and a memory, and at least one application module (AM) pool including a plurality of AMs, wherein the plurality of controller platforms are coupled by an input/output (I/O) mesh network to I/O devices coupled to field devices that are coupled to processing equipment on a field level of the IPF;
a control application module orchestrator (CAMO) coupled to the plant-wide network for dynamically deploying the plurality of AM's to the controller platforms, the CAMO receiving resource consumption attribute data regarding the controller platforms comprising at least a pool of available storage in the memory and processing resources available for the computer hardware,
based on the resource consumption attributes, at least partially automatically deploying ones of the plurality of AMs to the plurality of controller platforms; and
wherein the plurality of controller platforms are configured as a first and at least a second controller pool, and wherein the at least one AM pool is configured as a first AM pool and at least a second AM pool, wherein the AM's in the first AM pool are deployable only in the first controller pool, the AM's in the second AM pool are deployable only in the second controller pool.

9. The network control system of claim 8, wherein the CAMO further implements real-time monitoring of available storage in the memory and the processing resources available from the computing hardware, wherein the at least partially automatically deploying comprises real-time deploying.

10. The network control system of claim 8, wherein the at least partially automatically deploying consists of exclusively of automatically determining.

11. The network control system of claim 8, wherein at least one of the plurality of controller platforms comprise a redundant controller pair.

12. The network control system of claim 8, wherein the AM pool comprises a plurality of AM's including redundant AM's including a primary AM and a backup AM.

13. The network control system of claim 8, wherein the at least partially automatically deploying comprises dynamically moving at least one AM in the AM pool responsive to at least one change to the plurality of controller platforms.

14. The network control system of claim 8, wherein the at least partially automatically deploying ones of the plurality of AMs to the plurality of controller platforms is implemented in a non 1:1 fashion.

15. The network control system of claim 8, wherein the CAMO is implemented partially within the plurality of controller platforms, and partially outside the plurality of controller platforms.

* * * * *